(12) United States Patent
Melot

(10) Patent No.: US 9,896,800 B2
(45) Date of Patent: Feb. 20, 2018

(54) METHOD FOR PRODUCING AN UNDERWATER PIPE

(71) Applicant: Technip France, Courbevoie (FR)

(72) Inventor: Mickaël Melot, Bouquetot (FR)

(73) Assignee: TECHNIP FRANCE (FR)

( * ) Notice: Subject to any disclaimer, the term of this patent is extended or adjusted under 35 U.S.C. 154(b) by 365 days.

(21) Appl. No.: 14/647,298

(22) PCT Filed: Nov. 14, 2013

(86) PCT No.: PCT/FR2013/052743
§ 371 (c)(1),
(2) Date: May 26, 2015

(87) PCT Pub. No.: WO2014/091100
PCT Pub. Date: Jun. 19, 2014

(65) Prior Publication Data
US 2015/0308043 A1 Oct. 29, 2015

(30) Foreign Application Priority Data
Dec. 11, 2012 (FR) ...................................... 12 61898

(51) Int. Cl.
*F16L 11/16* (2006.01)
*D07B 7/02* (2006.01)
(Continued)

(52) U.S. Cl.
CPC ............ *D07B 7/022* (2013.01); *D07B 3/005* (2013.01); *F16L 1/123* (2013.01); *F16L 9/042* (2013.01);
(Continued)

(58) Field of Classification Search
CPC ......... Y10T 29/53052; Y10T 29/53061; Y10T 29/53526; Y10T 29/5353; Y10T 29/49778;
(Continued)

(56) References Cited

U.S. PATENT DOCUMENTS 5,918,641 A 7/1999 Hardy et al. ................... 138/132
2011/0214773 A1 9/2011 Hamachi et al. .............. 138/137

FOREIGN PATENT DOCUMENTS

JP 63071612 A * 4/1988

OTHER PUBLICATIONS

International Search Report and Written Opinion dated Feb. 20, 2014 in corresponding PCT International Application No. PCT/FR2013/052743.

* cited by examiner

*Primary Examiner* — Jermie Cozart
(74) *Attorney, Agent, or Firm* — Ostrolenk Faber LLP

(57) ABSTRACT

A method for producing a tubular underwater pipe including: assembling a structure of peripheral metal elements (3A, 3B, 3C) wound in an S-Z configuration about a central flexible core (1) as the core is driven in movement along its longitudinal axis; providing an inductive sensor (12) arranged for rotation about the central flexible core (1) in a manner synchronized with the longitudinal movement of the core so that the sensor scans the periphery of the structure opposite and in the immediate proximity of peripheral elements wound about the core and during the assembly step; using the sensor (12) to acquire measurement signals (S) of which the amplitude varies according to whether or not the sensor (12) is located opposite a peripheral element
(Continued)

during the rotation of the sensor (12); and using the measurement signals to control the positioning of the assembled peripheral elements.

14 Claims, 2 Drawing Sheets

(51) Int. Cl.
*F16L 11/24* (2006.01)
*F16L 1/12* (2006.01)
*F16L 9/04* (2006.01)
*F16L 9/16* (2006.01)
*D07B 3/00* (2006.01)
*F16L 101/30* (2006.01)

(52) U.S. Cl.
CPC ............... *F16L 9/16* (2013.01); *F16L 11/16* (2013.01); *F16L 11/24* (2013.01); *D07B 2301/251* (2013.01); *D07B 2301/3583* (2013.01); *D07B 2301/5509* (2013.01); *D07B 2301/5559* (2013.01); *F16L 9/165* (2013.01); *F16L 2101/30* (2013.01); *Y10T 29/4978* (2015.01); *Y10T 29/49778* (2015.01); *Y10T 29/53052* (2015.01); *Y10T 29/5353* (2015.01); *Y10T 29/53061* (2015.01); *Y10T 29/53526* (2015.01)

(58) Field of Classification Search
CPC ....... Y10T 29/4978; F16L 11/16; F16L 1/123; F16L 1/203; F16L 1/206; F16L 9/042; F16L 9/128; F16L 9/16; F16L 9/165; F16L 11/24; F16L 2101/30
See application file for complete search history.

METHOD FOR PRODUCING AN UNDERWATER PIPE

CROSS-REFERENCE TO RELATED APPLICATIONS

The present application is a 35 U.S.C. § § 371 national phase conversion of PCT/FR2013/052743, filed Nov. 14, 2013, which claims priority of French Patent Application No. 1261898, filed Dec. 11, 2012, the contents of which are incorporated by reference herein. The PCT International Application was published in the French language.

TECHNICAL FIELD

The present invention concerns the field of producing pipes, notably intended for the offshore oil industry, and concerns in particular a method of producing a pipe of the type including a step of assembling a structure from peripheral elements wound in an S-Z configuration about a central flexible core driven in movement along its longitudinal axis.

TECHNICAL BACKGROUND

The elements assembled around the central flexible core in the S-Z configuration may be of diverse types, as a function of the intended type of pipe: electrical cables, hydraulic pipes, thermal insulation tubes, steel tubes, optical fibers, etc.

The method of assembling such peripheral elements around the central flexible core of the pipe in an S-Z configuration is well known and entails periodically reversing the direction of applying the peripheral elements around the central core. Thus this assembly method combines helical winding in a first direction with winding in the opposite direction, as opposed to the standard helical assembly method in which the elements are applied helically around the central core in only one direction.

Applying the peripheral elements in an S-Z configuration produces the best compromise between mechanical strength resisting traction/compression forces, fatigue resistance, production cost and the overall size of the assembly device, compared to assembling peripheral elements wound helically. However, carrying out such assembly is relatively complex and requires vigilance with regard to the correct positioning of the peripheral elements assembled in this way. In fact, if the S-Z application of the peripheral elements is not done correctly, this can lead to mechanical damage inside the pipe structure. In particular, if the pipe is subjected to traction and/or compression forces when used in service, the peripheral elements may buckle and therefore lead to loss of the physical integrity of the pipe.

In this regard, the reversing point, which defines the position at which the direction of rotation of the peripheral elements is changed, constitutes a particularly critical and sensitive zone when assembling the peripheral elements.

Also, assembling the peripheral elements around the core in the S-Z configuration is immediately followed by the application of retaining adhesive tapes which immobilize the assembly in order to prevent any destranding of the peripheral elements on reversing direction. Now, the adhesive power of the retaining tapes may be affected by the temperature in the place where the pipe is produced, in particular at low temperatures of the order of a few degrees Celsius, or conversely in high temperature ranges, around 35° C., with the problematic consequence of not being able to retain in the proper position the peripheral elements applied in the S-Z configuration.

Given the constraints explained above linked to the S-Z assembly, which are likely to cause problems of physical integrity for the pipes concerned, it is therefore advisable to control the correct positioning of these elements during the production of the pipe and to be more specific just after the step of assembling the peripheral elements in the S-Z configuration.

Until now, in-production checking has been carried out manually by an operative. One example of the various known types of manual control during assembly of the structure including peripheral elements in an S-Z configuration is to have an operative control visually the value of the helix angle, i.e. the angle between the element being checked and the generatrix of the pipe. The operative uses for this a calibration instrument taking the form of a transparent material support on which is defined a tolerance range for the helix angle, corresponding to acceptable values of the angle relative to a horizontal axis marked on the support and intended to be superposed on the generatrix marked on the flexible core. Once the horizontal axis of the support has been superposed on the generatrix, the operative then verifies that the helix angle of the elements being checked lies within the tolerance range, the measurement using the calibration instrument being effected at the half-pitch of the helix. However, this control method is unsatisfactory in that the resulting diagnosis depends greatly on the visual acuity of the operatives and their ability to maintain a high level of concentration over time, as well as on the quality of the measuring instruments made available to them. Also, as a function of these conditions, errors may occur at the time of the various readings, cause production of the pipe to fail and, as a result, lead to the production of a new pipe. Moreover, it is also necessary to stop the production line regularly in order for the operative to be able to verify that the data read off is in fact consistent with the pipe currently being produced. This control method is therefore relatively unreliable and is both time-consuming and costly to set up.

SUMMARY OF THE INVENTION

Against this background, an object of the present invention is to propose a method of producing a tubular underwater pipe of the aforementioned type free of the limitations referred to above and that in particular makes it possible to improve the reliability of checking the correct positioning of the assembled peripheral elements in accordance with an S-Z configuration during the production of the pipe, in order to guarantee the integrity of the pipe.

The invention achieves its objective by proposing a method for producing a tubular pipe notably intended for the transport of hydrocarbons coming from an underwater well, including a step of assembling a structure of metal peripheral elements, wherein said peripheral elements are wound in an S-Z configuration about a central flexible core that is driven in movement along its longitudinal axis, characterized in that it. The method includes the following steps:

providing at least one inductive sensor adapted to rotate about said central flexible core in a manner synchronized with the longitudinal movement of said central flexible core so that said at least one sensor scans the periphery of said central flexible core opposite and in the immediate proximity of said peripheral elements wound around said central flexible core during the assembly step;

using said at least one sensor to acquire measurement signals the amplitude of which varies according to whether or not said at least one sensor is located opposite a peripheral element wound around said core during the rotation of said at least one sensor around said central flexible core;

using said acquired measurement signals to control the positioning of said assembled peripheral elements.

Preferred but nonlimiting aspects of the method in accordance with the present invention are as follows:

said assembly step is followed by a step of applying a retaining adhesive tape around said peripheral elements assembled around said central flexible core, said step of applying said adhesive tape employing a tape-winding device on which said at least one sensor is mounted;

angular position data is acquired representative of the rotation movement of said at least one inductive sensor around said central flexible core and linear position data is acquired representative of the longitudinal movement of said central flexible core during the assembly step and said acquired measurement signals are processed by combining said acquired angular position data with said acquired linear position data to establish a representation of the respective application profiles of said peripheral elements along said central flexible core, said application profiles being used to control the positioning of said assembled peripheral elements;

parameters for controlling the winding in the S-Z configuration are determined for a controlled peripheral element on the basis of the application profile established for said controlled peripheral element and the evolution of said control parameters is monitored during said assembly step by comparing said control parameters to respective predetermined tolerance thresholds;

said control parameters include the pitch and/or the overlap angle and/or the helix angle of the winding in the S-Z configuration for said controlled peripheral element;

the method includes a step of triggering a visual and/or audible alarm if at least one of said control parameters is defective with respect to said predetermined tolerance thresholds and a step of signaling said at least one defective control parameter;

said control parameters are refreshed on each rotation of said at least one inductive sensor around said central flexible core;

multiple inductive sensors are disposed circumferentially with respect to said central flexible core;

multiple inductive sensors are disposed longitudinally with respect to said central flexible core.

The invention further concerns a device for implementing the method in accordance with the invention including means for moving a central flexible core along its longitudinal axis from a pay-out spool toward an assembly station and means for winding metal peripheral elements in an S-Z configuration about said central flexible core at said assembly station, said device being characterized in that it includes an acquisition unit including at least one inductive sensor adapted to be driven in rotation about said central flexible core in a manner synchronized with the longitudinal movement of said central flexible core so that said at least one sensor scans the periphery of said central flexible core opposite and in the immediate proximity of said peripheral elements assembled with said central flexible core and a processing unit coupled to said acquisition unit including processing means adapted to control the positioning of said peripheral elements around said central flexible core on the basis of measurement signals acquired by said at least one inductive sensor.

Preferred but nonlimiting aspects of the device of the present invention are as follows:

said at least one inductive sensor is mounted at the end of an articulated support arm fixed to a plate supporting a tape-winding device disposed after said assembly station, said support plate being adapted to be driven in rotation about the periphery of said central flexible core assembled with said peripheral elements to apply a retaining adhesive tape around said peripheral elements;

said at least one sensor is connected to means for conditioning the measurement signals the output of which is connected to a wireless communication interface enabling wireless data transfer between said acquisition unit and said processing unit;

said processing unit includes a control unit including a control console equipped with an input and/or programming keyboard, a display and signaling and alarm means.

BRIEF DESCRIPTION OF THE DRAWINGS

Other features and advantages of the invention will emerge from a reading of the following description of one particular embodiment of the invention given by way of nonlimiting illustration and with reference to the appended drawings, in which.

DESCRIPTION OF AN EMBODIMENT

Figure 1:
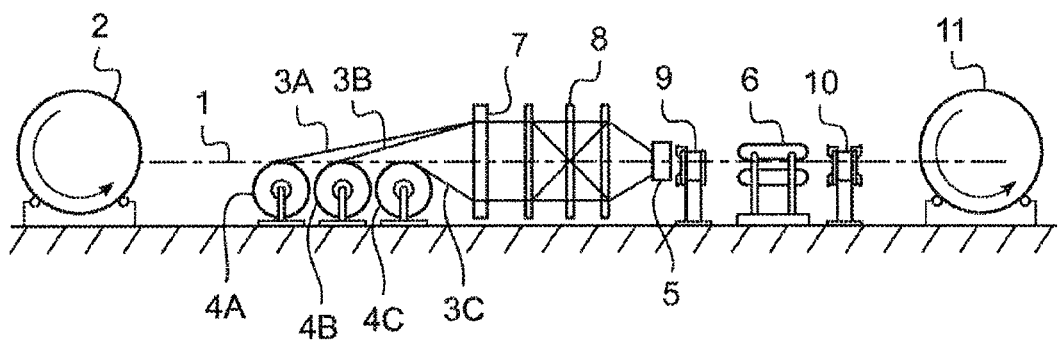
FIG. 1 shows diagrammatically an S-Z assembly device for implementing the method in accordance with the invention.

The device shown diagrammatically in FIG. 1 represents a production line designed for the production of different types of pipes for oil production at great depths, in particular, although not exclusively, for the production of integrated production bundle (IPB) type pipes. An IPB pipe typically includes a central flexible core the structure of which is well known in itself and defined by the standards API 17J and API RP 17B issued by the American Petroleum Institute, around which other layers of peripheral elements are stacked in accordance with an S-Z configuration, for example including hydraulic pipes, stainless steel tubes, electrical and/or optical cables and filling and/or thermal insulation tubes. This type of pipe therefore makes it possible to maintain the temperature of the central core in order to prevent the formation of hydrate plugs when the line is stopped, for example. Draining of gases and monitoring of the temperature of the line by means of optical fibers are also made possible.

FIG. 1 therefore shows by way of example a central flexible core 1 having a longitudinal axis, stored on a pay-out spool 2 and intended for the production of an IPB type pipe. A structure including metal peripheral elements is intended to be wound all around the central flexible core 1, in accordance with an S-Z configuration, including for example filler tubes or metal tubes 3A, 3B for installing one or more optical fibers and electrical cables 3C with metal armoring. These peripheral elements are stored on spools 4A, 4B, 4C. The peripheral elements 3A, 3B, 3C are wound in an S-Z configuration around the central flexible core 1 at an assembly station 5 on the path of movement of the central flexible core 1, imparting a required geometrical configuration to the peripheral elements assembled around the core.

For this assembly process, the central flexible core 1 is driven in axial movement from the pay-out spool 2 toward the assembly station 5 by a traction member 6 on the downstream side of the assembly station 5 and designed to impart movement in axial translation (advance movement) to the central flexible core 1. The operation of assembling the peripheral elements 3A, 3B, 3C onto the central flexible core 1 driven in movement in this way along its longitudinal axis toward the assembly station 5 entails winding the peripheral elements 3A, 3B, 3C to constitute a structure assembled in an S-Z configuration combining helical winding in a first direction "S" with winding in the opposite direction "Z". To this end, the peripheral elements 3A, 3B, 3C are guided through a stationary guide 7 toward a direction-reversing device 8 including a rotating applicator plate immediately upstream of the assembly station 5 and by means of which the peripheral elements are firstly driven with a movement in rotation around the central flexible core 1 in the direction "S" and afterwards with a movement in rotation in the reverse direction "Z". The advance movement of the central flexible core 1 generated by its longitudinal movement combined with the movement in rotation of the plate 8 for applying the peripheral elements 3A, 3B, 3C in one direction and then the other therefore enables assembly of these elements so that they extend around the central flexible core 2 along a path varying longitudinally in an S-Z configuration.

This step of assembling the structure made up of the peripheral elements in accordance with an S-Z configuration carried out at the assembly station 5 is followed by applying a retaining adhesive tape around the peripheral elements 3A, 3B, 3C assembled around the central flexible core 1, which immobilizes the assembly. This retaining tape is applied by means of a first tape-winding device 9 disposed immediately after the assembly station 5 on the production line and that is driven in rotation in a manner synchronized with the downstream traction member 6. For example, each revolution of the tape-winding device corresponds to a 130 mm advance of the central flexible core. A second tape-winding device 10 is preferably placed behind the traction member 6 to apply a second retaining tape around the structure made of the peripheral elements and is also driven in rotation in a manner synchronized with the traction member 6. Finally, the central flexible core 1 assembled with the peripheral elements in the S-Z configuration is fed to a take-up spool 11.

Figure 2:
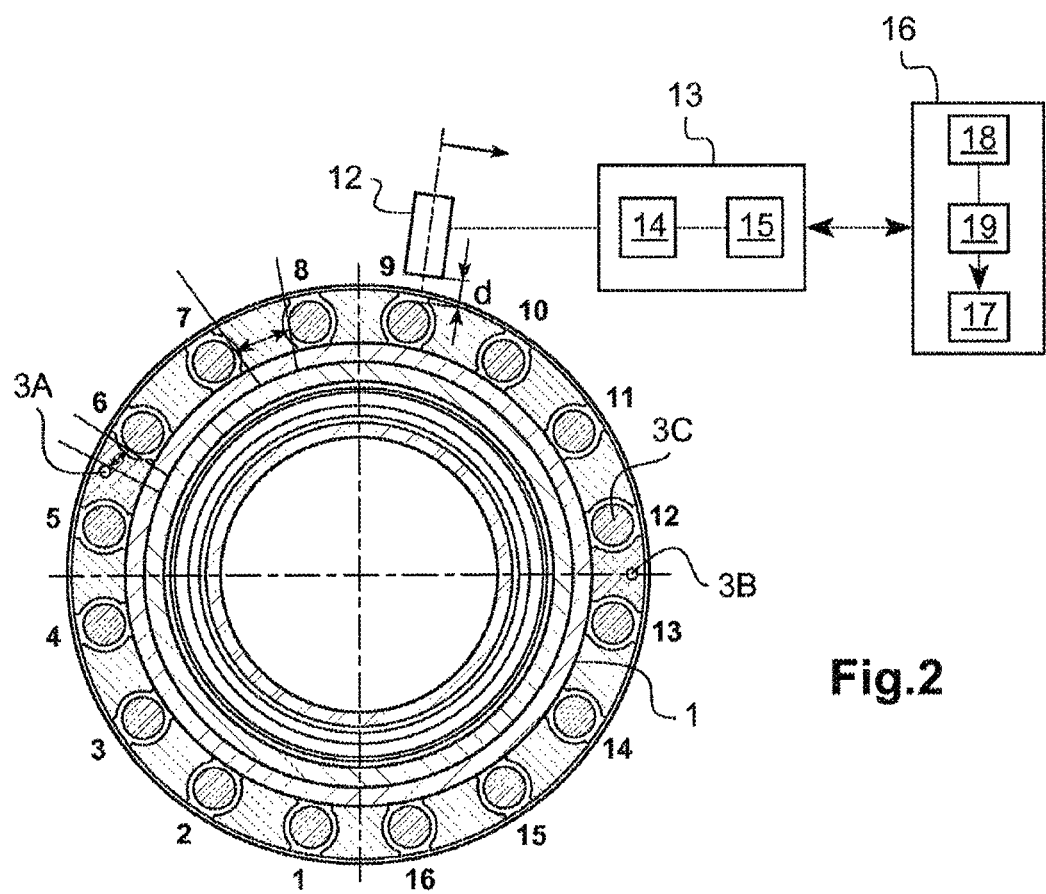
FIG. 2 shows diagrammatically in section an example of a pipe with a structure including peripheral elements assembled around the central core of the pipe in an S-Z configuration.

The method in accordance with the invention is therefore directed to automatic control in real time during the assembly step of the positioning of the peripheral elements resulting from assembling these elements in an S-Z configuration around the central flexible core 1. As shown in FIG. 2, controlling the S-Z configuration structure in this way is based on tracking the metal peripheral elements 3A, 3B, 3C (cables and tubes) by means of an inductive sensor 12 adapted to rotate about the structure made up of the peripheral elements in the S-Z configuration so as to be able to scan the whole of the structure opposite and in the immediate proximity of the peripheral elements wound around the central flexible core 1. In order to be able to control the whole of the S-Z structure of the pipe the inductive sensor 12 is preferably mounted at the end of an articulated support arm fixed to a rotating support plate of the first tape-winding device 9 or the second tape-winding device 10. The tape-winding device (9; 10) being driven in rotation in a manner synchronized with the traction member 6, the inductive sensor 12 on the tape-winding device (9;10) is therefore driven in rotation around the structure in a manner synchronized with the longitudinal movement of the central flexible core 1. As a result, by combining the advance movement of the central flexible core 1 in the longitudinal direction with the movement in rotation of the inductive sensor 12, combined with the rotation of the tape-winding device (9;10), it is possible to construct a 2D map of the structure and therefore to establish a developed plane representation of the path of the peripheral elements along the central flexible core 1.

To do this, the sensor 12 cooperates with an acquisition unit 13 on the tape-winding device (9;10) and including conditioning means 14 connected to the sensor 12 adapted to receive and to condition the measurement signals delivered by the sensor 12 and a wireless communication interface 15 enabling wireless data transfer between the onboard acquisition unit 13 and a remote processing unit 16 for controlling the positioning of the peripheral elements around the central flexible core on the basis of the measurement signals acquired by the inductive sensor 12. The wireless communication interface 15 consists for example of a radio interference enabling exchange of information with the processing unit 16 via a standard wireless local area network, for example a Wifi, Zigbee or Bluetooth network.

To be more precise, the inductive sensor 12 is responsive to the presence of metal screens in the immediate proximity liable to disturb the magnetic field emitted by the sensor. Also, the amplitude of the signal detected by the sensor 12 varies as the sensor 12 coupled to the tape-winding device (9;10) rotates, according to whether or not it is facing a metal peripheral element of the S-Z structure to be controlled, for example a tube for installing an optical fiber or an electrical cable. For the peripheral elements of the S-Z structure to be detected correctly, the sensor-peripheral element distance d must be as small as possible, without the sensor coming into contact with the pipe. It varies as a function of the type of sensor used. The position of the sensor 12 is advantageously adjusted so that this distance d is less than 10 mm and preferably equal to approximately 1 mm.

Figure 3:
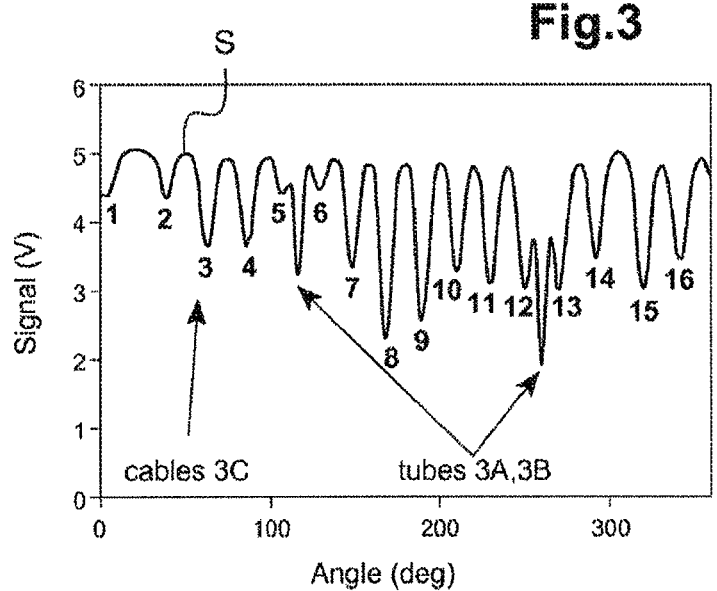
FIG. 3 shows the waveform of a measurement signal for the positioning of the various elements constituting the structure shown in FIG. 2.

FIG. 3 thus shows the measurement signal S acquired by the sensor 12, translated into the form of an electrical signal, for one complete revolution of the sensor around the S-Z structure shown in FIG. 2. The measurement signal includes multiple detection peaks each corresponding to the detection of a respective peripheral element of the S-Z structure during 360° scanning of the structure by the sensor. The detection peaks in FIG. 3 are numbered to correspond to the numbers assigned to the electrical cables 3C of the S-Z structure shown in FIG. 2. The peaks present in the signal between the detection peaks 5 and 6 and between the detection peaks 12 and 13 are therefore representative of detection of the optical fiber installation tubes 3A and 3B, respectively.

The measurement signals acquired in this way by the inductive sensor 12 during application of the peripheral elements in the S-Z structure are transmitted via the wireless communication interface 15 of the acquisition unit 13 on the tape-winding device (9;10) to the remote processing unit 16, which consists of a control unit, preferably including a control console 17 equipped with an input and/or programming keyboard, a display and (luminous and/or audible) signaling and alarm means. The control unit 16 further includes a memory 18 for storing the amplitude of the measurement signals acquired on each revolution of the sensor 12.

The control unit 16 is also connected to angular and linear coder sensors installed on the tape-winding device (9;10) to determine during application of the S-Z structure the instantaneous angular position of the inductive sensor 12 linked to its movement in rotation and the length of the longitudinal movement of the central flexible core 12 linked to its advance movement, respectively. This angular and linear position data received by the control unit 16 is stored in the memory 18 of the control unit with the measurement signals received from the inductive sensor 12.

Figure 4:
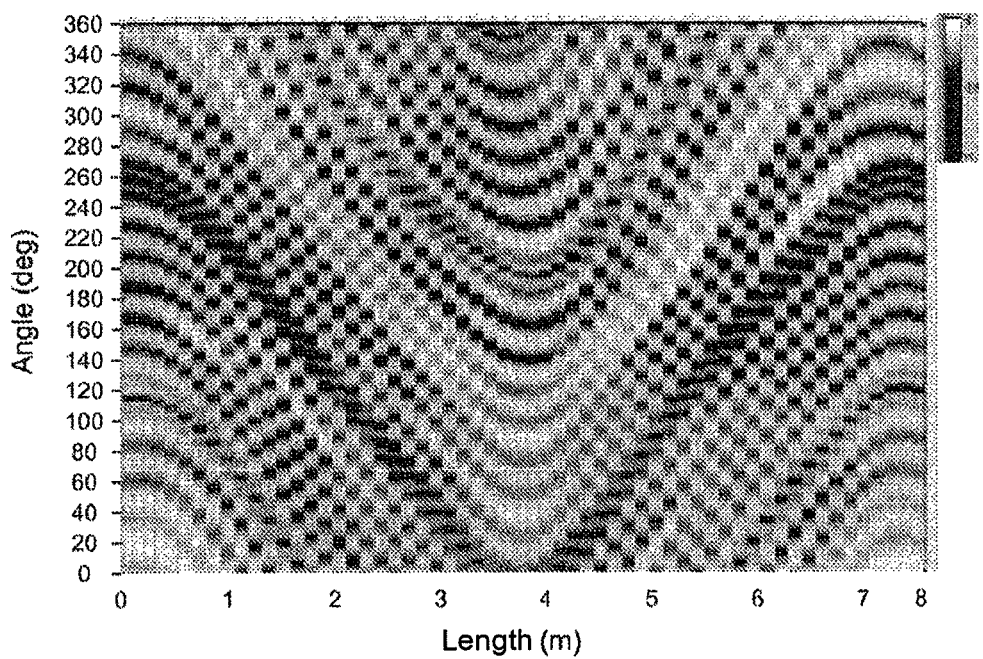
FIG. 4 shows a 2D map of said structure established in accordance with the present invention.

The control unit 16 further includes data processing means 19 designed to synchronize the linear and angular position data received with the measurement signals acquired by the inductive sensor 12 and to process them in order to construct the 2D map of the S-Z structure shown in FIG. 4, describing the detected angular position of the peripheral elements of the S-Z structure around the central core 1 as a function of the length of the longitudinal movement of the central core 1 (the shaded pixels correspond to detection of the metal peripheral elements of the structure and the white pixels to detection of non-metal parts). The data processing means 19 are further designed to track in particular one of the signals present in the representation of the 2D map during the process of assembling the peripheral elements, in order to establish a representation of the application profile (S-Z curve) of the element concerned and thereby to obtain access to different winding control parameters based on the application profile established in this way. For example, the processing means 19 enable identification in the 2D map of the characteristic signal coming from the tube 3A or 3B for installing an optical fiber thanks to the characteristic peak present in the measurement signal from the sensor between the detection peaks 5 and 6 or between the detection peaks 12 and 13, as shown in FIG. 3.

On the basis of the measurement signals from the inductive sensor 12 and by combining the data of the stored angular and linear positions, the processing means 19 therefore enable determination of the angular position at which the controlled peripheral element was located as a function of the measured length of the longitudinal movement of the central core and therefore progressive reconstruction of the application profile for that element during the S-Z assembly process. The application profile established in this way for this element could advantageously be displayed on the display of the control console 17 of the control unit during the assembly process.

From the application profile established in this way, it is then easy to obtain access in particular to the pitch, to the overlap angle and to the helix angle of the winding in accordance with the S-Z configuration, providing the same number of winding control parameters. Also, the processing means 19 are designed to calculate at least one of or preferably all of these control parameters from the application profile established for the controlled element by appropriate processing by software of the displayed curve representative of the application profile. Remember that the pitch corresponds to the distance between two reversing points for the same direction of the application profile, the overlap angle to the angle through which the control element rotates between two successive reversals, and the helix angle to the angle between the controlled element and the straight line generatrix of the pipe at half the helix pitch.

Production tolerance ranges defined by high and low tolerance thresholds are fixed by an operative for each of the above control parameters before execution of the assembly process, for example. Accordingly, the processing means 19 are further designed to track the evolution of these control parameters throughout the assembly process, comparing them to the predetermined tolerance thresholds. The winding control parameters calculated by the processing means 19 are preferably refreshed on each rotation of the tape-winding device (9; 10), i.e. on each revolution of the sensor 12 about the S-Z structure. Real time access is therefore available to the information concerning the correct positioning of the peripheral elements, therefore enabling continued production of the IPB line subjected to traction/compression forces.

If at least one control parameter is detected as being defective, i.e. if its calculated value is outside the previously set tolerance range, the processing means 19 of the control unit 16 trigger a visual and/or audible alarm and signal the defective control parameter or parameters, preferably signaling the corresponding length measurement in which the parameters were detected as being defective. This signaling may be effected by means of an alarm window displayed on the display of the control console 17, for example.

The implementation of the method of the invention has been described with a single inductive sensor 12 mounted to rotate about the S-Z structure of the pipe. In fact, given that the area in which the reversing points of the S-Z winding of a controlled element is included within an interval of at least 130 mm and, as described above, on each revolution of the tape-winding device the pipe advances 130 mm, the presence of a single inductive sensor will therefore make it possible to track the application profile of a controlled element point by point with relatively good resolution and in particular with the certainty of detecting the critical area in which the reversing point is located. However, detection resolution may be further improved by increasing the rotation speed of the sensor (which amounts to reducing the advance movement of the central flexible core on each revolution of the tape-winding device) or increasing the number of inductive sensors. Also, in accordance with a variant embodiment of the method, multiple inductive sensors are used that are mounted so as to rotate about the S-Z structure of the pipe. In this case, the inductive sensors may be disposed circumferentially or longitudinally with respect to the controlled structure.

The present invention has been more particularly described with reference to the production of an IPB type pipe but it may equally well be applied to the production of other types of pipes, such as integrated service umbilicals (ISU) and gas lift umbilicals (GNU), to address the problem of controlling the correct positioning of metal peripheral elements applied in an S-Z configuration during production of these pipes.

The invention claimed is:

1. A method of producing a tubular pipe configured for the transport of hydrocarbons, the method including steps of:
    assembling a structure of metal peripheral elements, winding the peripheral elements in an S-Z configuration about a central flexible core while driving the core in movement along a longitudinal axis of the core;
    rotating at least one inductive sensor about the central flexible core in a manner synchronized with longitudinal movement of the central flexible core, for causing the at least one sensor to scan the periphery of the central flexible core opposite and in the proximity of the peripheral elements wound around the central flexible core during the assembly step;

operating the at least one sensor to acquire measurement signals having an amplitude which varies according to whether or not the at least one sensor is located opposite a peripheral element wound around the core during the rotation of the at least one sensor around the central flexible core; and using the acquired measurement signals to control the positioning of the assembled peripheral elements.

2. The method as claimed in claim 1, further comprising:
following the assembly step by a step of applying a retaining adhesive tape around the peripheral elements assembled around the central flexible core.

3. The method as claimed in claim 2, further comprising:
applying, by a tape-winding device, the adhesive tape, wherein the at least one sensor is mounted on the tape-winding device.

4. The method as claimed in claim 1, further comprising:
acquiring angular position data representative of the rotation movement of the at least one inductive sensor around the central flexible core;

acquiring linear position data representative of the longitudinal movement of the central flexible core during the assembly step; and processing the acquired measurement signals by combining the acquired angular position data with the acquired linear position data to establish a representation of the respective application profiles of the peripheral elements along the central flexible core, and using the application profiles to control the positioning of the assembled peripheral elements.

5. The method as claimed in claim 4, further comprising:
determining parameters for controlling the winding in the S-Z configuration for a controlled peripheral element based on the application profile established for the controlled peripheral element; and evolution of the control parameters during monitoring the assembly step by comparing the control parameters to respective predetermined tolerance thresholds.

6. The method as claimed in claim 5, wherein the control parameters include at least one of pitch, an overlap angle and a helix angle of the winding in the S-Z configuration for the controlled peripheral element.

7. The method as claimed in claim 5, further comprising:
triggering a visual and/or audible alarm if at least one of the control parameters is defective with respect to the predetermined tolerance thresholds, and signaling the at least one defective control parameter.

8. The method as claimed claim 5, further comprising:
refreshing control parameters on each rotation of the at least one inductive sensor around the central flexible core.

9. The method as claimed in claim 1, further comprising:
disposing multiple inductive sensors circumferentially with respect to the central flexible core.

10. The method as claimed in claim 1, further comprising:
disposing multiple inductive sensors longitudinally with respect to the central flexible core.

11. A device for implementing the method as claimed in claim 1, comprising:
means for moving a central flexible core along a longitudinal axis thereof from a pay-out device toward an assembly station;

means for winding metal peripheral elements in an S-Z configuration about the central flexible core at the assembly station;

an acquisition unit including at least one inductive sensor supported and operative to be driven in rotation about the central flexible core and in a manner synchronized with longitudinal axis direction movement of the central flexible core so that the at least one sensor scans the periphery of the central flexible core opposite and in proximity to the peripheral elements assembled with the central flexible core; and a processing unit coupled to the acquisition unit and including a processing means configured and operable to control positioning of the peripheral elements assembled around the central flexible core based on measurement signals acquired by the at least one inductive sensor.

12. The device as claimed in claim 11, wherein the at least one inductive sensor is mounted at an end of an articulated support arm fixed to a plate supporting a tape-winding device which is disposed after the assembly station in the movement of the core, the support plate being supported and operable to be driven in rotation about the periphery of the central flexible core assembled with the peripheral elements in order to apply a retaining adhesive tape around the peripheral elements.

13. The device as claimed in claim 11, further comprising:
the at least one sensor is connected to means for conditioning the measurement signals which are connected to a wireless communication interface enabling wireless data transfer between the acquisition unit and the processing unit.

14. The device as claimed in claim 11, further comprising:
the processing unit includes a control unit including a control console equipped with an input and/or programming keyboard, a display, and signaling and an alarm.

* * * * *